United States Patent
Pettersen

[15] 3,659,129
[45] Apr. 25, 1972

[54] INSULATED BAR DYNAMOELECTRIC MACHINE AND METHOD OF FORMING

[72] Inventor: Thomas P. Pettersen, Schenectady, N.Y.
[73] Assignee: General Electric Company
[22] Filed: Sept. 15, 1970
[21] Appl. No.: 72,461

[52] U.S. Cl. ............................. 310/216, 310/211, 310/217, 310/261
[51] Int. Cl. ............................................................ H02k 1/00
[58] Field of Search ............................. 310/211, 216–218, 310/261, 265, 270; 336/210

[56] References Cited

UNITED STATES PATENTS

| 431,134 | 7/1890 | Winkler | 310/261 X |
|---|---|---|---|
| 441,246 | 11/1890 | Lieb | 310/217 X |
| 2,221,983 | 11/1940 | Mayer et al. | 310/216 X |
| 2,406,045 | 8/1946 | Stevens | 336/210 X |
| 3,335,308 | 8/1967 | Robinson | 310/211 |
| 3,428,842 | 2/1969 | Harris | 310/217 |

Primary Examiner—J. D. Miller
Assistant Examiner—Mark O. Budd
Attorney—John J. Kissane, James C. Davis, Jr., Frank L. Neuhauser, Oscar B. Waddell and Joseph B. Forman

[57] ABSTRACT

Rotor bars of a high starting torque squirrel cage motor are insulated from the sheet metal laminations forming the rotor by disposing insulating laminations at spaced apart locations along the rotor axis. The insulating laminations are pre-slit in registration with the slots of the juxtaposed sheet metal laminations and as the rotor bars are driven through the sheet metal laminations, the leaves of the pre-slit insulating laminations are folded back by the advancing bars to electrically insulate the rotor bars from the sheet metal laminations.

8 Claims, 7 Drawing Figures

PATENTED APR 25 1972

INVENTOR.
THOMAS P. PETTERSEN
BY John J. Kissane
HIS ATTORNEY

INSULATED BAR DYNAMOELECTRIC MACHINE AND METHOD OF FORMING

This invention relates to an insulated bar dynamoelectric machine and to a method of forming such machine. In a more particular aspect, the invention relates to the insulation of rotor bars from the magnetic laminations forming the rotor by disposing pre-slit insulating laminations at selected locations adjacent the magnetic laminations forming the rotor thereby permitting a portion of the insulating laminations to be folded over the edge of the adjacent sheet metal lamination slots as the rotor bars are inserted into the slots.

In many industrial applications, e.g., sugar centrifugal motors or a punch press rotor, it is desirable that the drive motor be characterized by a high starting torque which torque permissibly can drop as the motor accelerates to running speed. While such motor characteristics obviously can be obtained from either a direct current motor or a wound rotor motor, the labor costs involved in winding such motors has given impetus to the fabrication of more cheaply constructed squirrel cage motors having similar torque characteristics.

Among the techniques heretofore proposed to produce high starting torque in squirrel cage motors is to utilize high resistance rotor bars within the motor. However, because the heat generated by current flow through the high resistance rotor bars is difficult to dissipate, a particularly preferred design for high starting torque squirrel cage motors utilizes low resistance rotor bars with at least one end of the rotor bars protruding outwardly from the rotor laminations. Typically, a high resistance end ring is employed to interconnect the protruding ends of the low resistance rotor bars to provide the resistance desired for high starting torque while localizing the generated heat in an area remote from the magnetic laminations and stator windings of the motor.

Because high starting torque squirrel cage motors characteristically exhibit high bar to bar voltages (with the maximum voltage occurring pole to pole often having a magnitude of approximately 3-4 volts), the rotor bars of high starting torque squirrel cage motors normally are insulated from the rotor laminations to inhibit shorting of the bars by the laminations and the attendent sparking produced by the transfer of current from the bars to the laminations. One of the more common methods heretofore employed to insulate rotor bars from the laminations is by the insertion of insulating slot liners along three faces of each slot prior to insertion of the bars within the slots. The bars then are spaced from the fourth face of the slot by insulating wedges driven between the bar and the uninsulated slot face. This method, however, is deficient because the bars must be loose-fitting to prevent driving the insulating strips from the slot and because the wedges employed to secure the bars within the slots can be thrown by the dynamic forces exerted on the motor components during operation. In such event, the loose bars tend to vibrate leading to motor failure via cracking or fracture. Attempts to overcome this problem by coating the bars with an insulating material, e.g., a conventional ceramic insulator, prior to barring generally have been ineffective because the sharp edges of the punched slots tended to shear the insulation from the rotor bar during barring.

It is therefore an object of this invention to provide an inexpensive method for automatically insulating rotor bars during barring.

It is also an object of this invention to provide a method of insulating rotor bars wherein the rotor bars are insulated from the rotor laminations automatically upon insertion of uninsulated bars within unlined slots.

It is a further object of this invention to provide a dynamoelectric machine wherein uninsulated rotor bars are snugly set within the rotor slots without the use of driven wedges.

It is a still further object of this invention to provide a dynamoelectric machine wherein the possibility of centrifugally thrown wedges and loose bars is eliminated.

These and other objects of this invention generally are achieved by the utilization of insulating laminations having pre-slit sections in registration with the slots of the juxtaposed sheet metal laminations to fold over upon the edges of the adjacent sheet metal lamination slots as the rotor bar is inserted into the slots thereby insulating the bar from the sheet metal laminations. Thus, a dynamoelectric machine in accordance with this invention would include a magnetizable member composed of a plurality of juxtaposed sheet metal laminations in axial alignment to form a substantially cylindrical surface with each lamination being punched at prescribed locations to provide axially extending slots circumferentially spaced along the cylindrical surface of the member. At least one lamination of electrically insulating material is juxtaposed with the sheet metal laminations situated at opposite ends of the magnetizable member and the insulating laminations are slit at locations axially aligned with the slots of the juxtaposed sheet metal laminations. As the conductor bars are inserted into the axially extending slots of the magnetizable member, the slit sections of the insulating lamination are folded back to overlap at least a portion of the edge of the slot in the juxtaposed sheet metal lamination to electrically insulate the conductor bars from the sheet metal laminations.

While the specification concludes with claims particularly pointing out and distinctly claiming that which is regarding of the present invention, a more complete understanding of the invention can be obtained from the following detailed description of various specific embodiments taken in conjunction with the accompanying drawings wherein, FIG. 1 is a partially broken away sectional view of a dynamoelectric machine in accordance with this invention;

Figure 1:
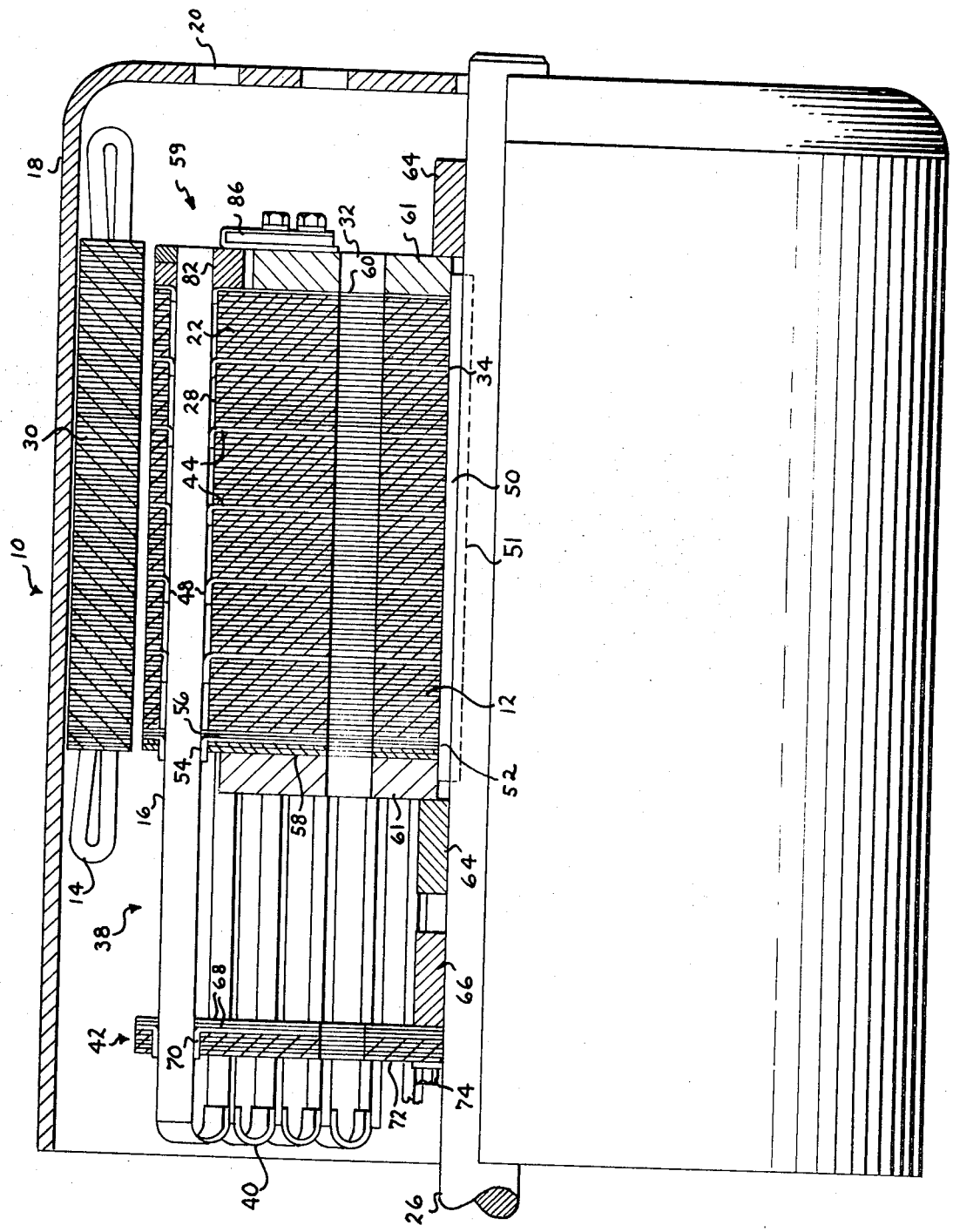

A squirrel cage motor 10 formed in accordance with this invention is illustrated in FIG. 1 and generally includes a rotor 12 having a stator winding 14 of conventional configuration circumferentially disposed about the rotor to electromagnetically interact therewith upon energization to provide the driving torque for the rotor. The stator winding is disposed within aligned slots in laminated stator core 30 and the entire stator is enclosed within a housing 18 having ventilation slots, e.g., slots 20, disposed at opposite ends of the motor to permit cooling of the motor by the passage of air therethrough.

Rotor 12 primarily is formed of a plurality of sheet metal laminations 22 of generally annular configuration having a central aperture for axially mounting the laminations upon shaft 26 while a plurality of space apart circumferentially disposed slots 28 are punched along the periphery of the laminations to permit axial passage therethrough of rotor bars 16. In conventional fashion, the upper face of each slot is provided with a slit to communicate the rotor bars within the slots with the air space between the rotor and stator. A plurality of axially aligned apertures 32 also are provided within the rotor to permit a fluid coolant, typically air, to flow through the interstices of the rotor while a key slot 34 extending upward from the periphery of the central aperture within the sheet metal laminations functions to axially align the sheet metal laminations upon the rotor shaft.

To obtain the high starting torque characteristics desirable for the motor, low resistance rotor bars 16, typically of aluminum, extend axially through aligned rotor slots 28 with at least one end of the rotor bars, illustrated in FIG. 1 as end 38, protruding from the juxtaposed sheet metal laminations to permit a majority of the heat generated within the rotor to be located in a region remote from the laminations. To selectively enhance the resistance of the rotor bars at protruding end 38, a high resistance end ring 40 is employed to interconnect the protruding ends of the bars. Typically end ring 40 is formed of a plurality of conductive loops of aluminum, bronze, brass or other copper alloy having a length and current carrying area designed to assure that at least a majority, and preferably in excess of 75 percent, of the rotor resistance is situated externally of the sheet metal laminations. Because of the cantilever action exerted upon the extended rotor bars during operation, a support wheel 42 is axially mounted upon rotor shaft 26 to peripherally receive and constrain the extended ends of the rotor bars remote from the laminations.

Support wheel 42 desirably is formed of a plurality of sheet metal laminations identical to the sheet metal laminations forming rotor 12. Utilization of rotor laminations for the support wheel not only reduces the number of component parts required for fabrication of the motor but also assures precise registration between the support wheel and the rotor bars. The number of sheet metal laminations required for support wheel 42 will vary dependent upon such factors as the span of the support wheel from the rotor, the speed of the motor, the geometric configuration of the rotor bars and the tensile strength of the sheet metal laminations. In general, approximately five to 15 19 mil thick steel sheet metal laminations have been found to be suitable for retaining the ends of $1 \times 0.4$ inch aluminum conductor bars protruding approximately 4.6 inches from the ends of a rotor designed to rotate at approximately 3,600 R.P.M.

Figure 2:
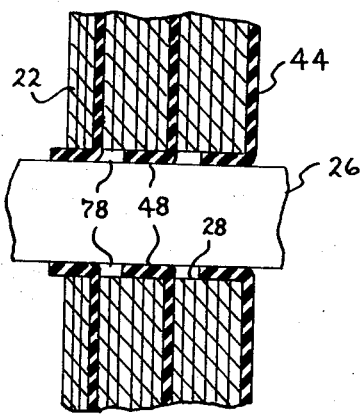
FIG. 2 is an enlarged sectional view illustrating the insulation of a rotor bar from the sheet metal laminations forming the rotor.

To inhibit the shorting of the rotor bars to the sheet metal laminations in accordance with this invention, a plurality of insulating laminations 44 having pre-slit sections 46 in registration with slots 28 are disposed at spaced apart locations along the axis of rotor shaft 26. The pre-slit sections permit the leaves 48 formed by the slits to fold back under the longitudinal pressure of the advancing rotor bar during barring to overlap the edge of the adjacent sheet metal laminations, as shown in FIG. 2, and insulate the sheet metal laminations from the rotor bar. Because the maximum mechanical forces applied to the rotor bars during operation are situated at the outer ends of the bars, insulating laminations 44 should be positioned at least at both ends of the rotor.

While insulating laminations situated only at opposite ends of the rotor can effect a complete insulation of the rotor bars from all the sheet metal laminations forming the rotor when slots 28 are perfectly aligned, superior insulation of the rotor bar is obtained when a plurality of insulating laminations are disposed at equally spaced intervals along the axis of the rotor, e.g., every 0.6 inches. Axially displaced insulating laminations along the rotor also assist in aligning the slots during barring without the attendent shorting of the laminations to the bar as generally occurs when insulated bars are inserted in slots without insulating laminations. If desired, complete insulation of the rotor bar from the sheet metal laminations can be assured by disposing the insulating laminations at an axial span equal to, or slightly in excess of, the radius of rotation of leaves 48 formed by pre-slit sections 46.

In general, the thickness of the insulating laminations can vary dependent upon such factors as the axial alignment of the slots and the number of insulating laminations utilized along the length of the rotor. For example, when the insulating laminations are positioned at an axial span such that the folded leaves of each insulating lamination extend to the adjacent lamination, the thickness of the insulating laminations can be substantially reduced relative to the thickness required for insulating laminations having a substantial span, e.g., one-half the rotor axis, between laminations. Insulating laminations having a thickness between 5 and 30 mils generally have been found preferable for most rotor structures with 10 mil thick insulating laminations being found optimum for Nomex polyamide laminations spaced at a span of 0.6 inches.

Insulating laminations 44 desirably should be formed of an electrical insulator capable of withstanding elevated temperatures in excess of 150° C without softening or thermally degrading to assure that the rotor bars will not loosen during operation. The insulation also should be capable of withstanding a 90° fold without fracturing. Among the materials found to be suitable for utilization in this invention are insulators sold under the trademarks Mylar, D.M.D., Nomex, etc.. Insulators such as Teflon, on the other hand, generally are not desirable because of the tendency of Teflon to creep, flow or cut through at low compressive loads and because of the low co-efficient of friction between Teflon and most metals.

Figure 3:
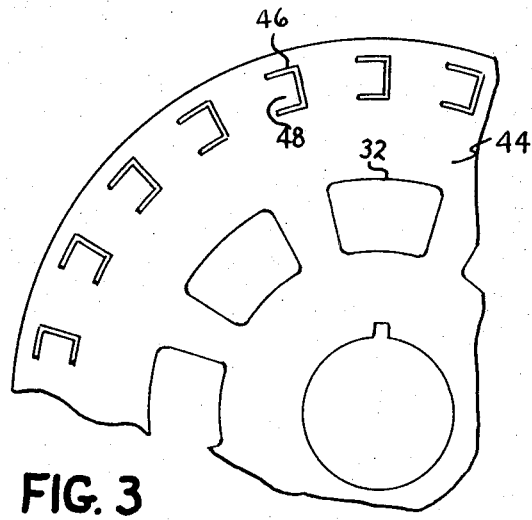
FIG. 3 is a broken away plan view of an insulating lamination in accordance with this invention.
Figure 4:
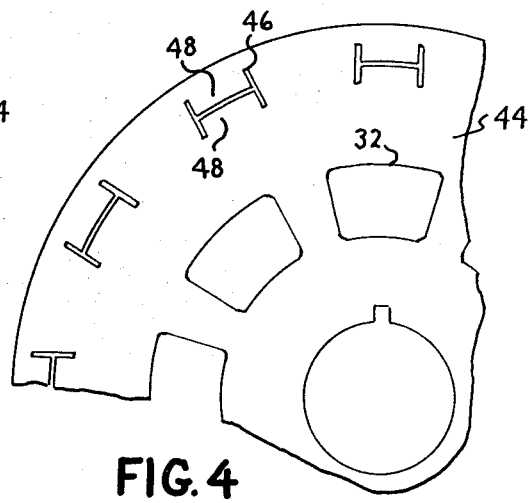
FIG. 4 is a broken away plan view illustrating an alternate slit configuration for the insulating lamination of FIG. 3.
Figure 5:
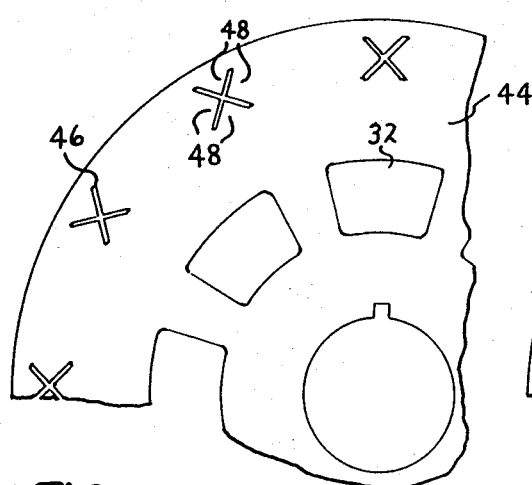
FIG. 5 is a broken away plan view illustrating still another slit configuration suitable for the insulating lamination of FIG. 3.
Figure 6:
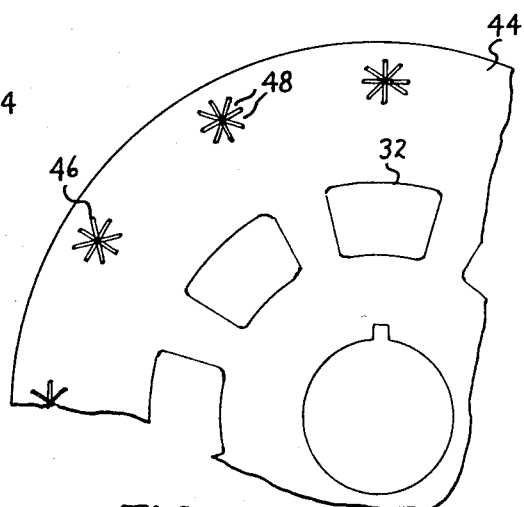
FIG. 6 is a broken away plan view of a slit configuration suitable for utilization with round rotor bars.

The slit configuration employed in the insulating laminations can be varied dependent upon such factors as the degree of insulation required and the geometric configuration of the rotor bars. For example, at the extended end 38 of the rotor whereat the mechanical stresses upon the bars are maximum, four juxtaposed C cut insulating laminations, illustrated in FIG. 3, could be employed with the rotational edge of the leaves in each lamination being displaced by 90° relative to the rotational edges of the leaves in the other insulating laminations. The number of laminations required to assure 100 percent insulation at the extended end of the rotor can be reduced by slitting the insulating lamination in an H configuration, as illustrated in FIG. 4, thereby providing insulating leaves 48 simultaneously on opposite sides of the rotor bars as the bars are passed therethrough. Similarly, complete coverage of the rotor bar also can be obtained utilizing two H cut laminations wherein the cross bars of the H in each lamination are orthogonal. For those insulating laminations situated along the interior of the rotor where the stresses upon the rotor bars are relatively small, the pre-slit sections preferably are slit in X configuration, as illustrated in FIG. 5, to provide four leaves 48 which are folded down over the adjacent sheet metal laminations by the rotor bars during insertion into slots 28. When round rotor bars are employed in the motor, the insulating laminations preferably are pre-slit into a plurality of pie-shaped sections 46, as portrayed in FIG. 6, to permit folding of leaves 48 without excessive tearing of the leaves by the rotor bars during barring.

To form rotor 12 in accordance with this invention, key 50 is inserted in axial slot 51 within rotor shaft 26 and sheet metal laminations 22 are stacked upon the shaft with the key slot of each lamination producing an axial alignment of slots 28 in the juxtaposed laminations. At pre-determined intervals, for example, every 0.6 inches, there is inserted an insulating lamination 44 having a configuration identical to the sheet metal laminations (except for a slit of X configuration at the location of slots 28 in the sheet metal laminations). To assure 100 percent insulation at end 38 of the rotor whereat the rotor bars protrude, a group of 3 insulating laminations 52 (consisting of one H cut lamination 54 and two C cut laminations 56 having axes of rotation perpendicular to the rotary edges of the H cut lamination) are positioned adjacent the outer metallic laminations 58 forming the rotor. Because the rotor bars are not extended beyond rotor end 59, a single X cut insulating lamination 60 can be situated at end 59 without exceeding the tolerable pressure distribution upon the folded back insulating leave. Annular flanges 61 then are mounted at opposite ends of the stacked laminations and the stacked laminations are compressed, e.g., by a force of 40 tons for an 8 inch stack, whereupon rings 64 are shrunk upon the shaft to maintain the rotor laminations in a compressed state. A second shrink ring 66 subsequently is mounted on the rotor shaft and a support wheel 42 (consisting of two C cut insulating laminations 68 and one H cut insulating lamination 70 situated proximate the rotor and at least one sheet metal lamination 72 situated remote from the rotor) is affixed to the shrink ring by bolts 74. Rotor bars 16 then are inserted within axial slots 28 from end 59 and the leaves of the insulated laminations are folded back by the advancing rotor bars to insulate the bar from the sheet metal laminations. The insulating leaves also wedge the rotor bar into a position such that sufficient spacing 78 exists between the edges of the slots and the bar to inhibit electrical contact between the bar and those sheet metal laminations not covered by the folded back leaves of the insulating laminations. After each rotor bar is inserted into slot 28, electrical continuity between the sheet metal laminations and the rotor bar is checked to assure that the rotor bars are electrically isolated from the laminations. When the rotor has been completely barred, an end ring 82, typically of aluminum, is positioned adjacent the rotor bars at end 59 and welded thereto. Because it is desirable to provide a substantial majority of the rotor resistance at the ends of the rotor bars remote from the laminations and stator winding, end 38 of the rotor bars are interconnected by welding relatively high resistance loops 40, suitably of aluminum, to each aluminum rotor bar. When the motor is to be mounted in a vertical position during operation, a support, such as suitably insulated annular ring 86, is positioned in an underlying attitude relative to end ring 82 and bolted to annular flange 61 to inhibit slippage of bars 16 from the rotor slots.

Figure 7:
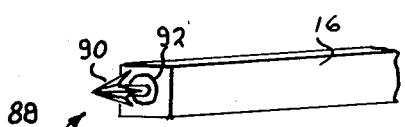
FIG. 7 is an isometric view depicting a simplified cutting tool suitable for selectively slitting the insulating laminations during insertion of the rotor bar within the slots.

Although the insulating laminations preferably are characterized by slits of a desired configuration in registration with the slots of the sheet metal laminations prior to barring, slitting of the insulating lamination also can be achieved during barring by providing a cutting edge along the forward end of the inserted rotor bar. A simplified structure suitable for slitting the insulating lamination is illustrated in FIG. 7 wherein crossed arrowhead 88 having prongs 90 disposed along the diagonal axis of the rotor bar is affixed to the forward end of the bar by any suitable means, illustrated by detachable suction cup 92 in FIG. 7. As the bar is inserted into the slots, the arrowhead dissects the portion of the insulating laminations in registration with the slots into an X configuration (as illustrated by the insulating lamination of FIG. 5) whereafter the leaves cut by the arrowhead are folded down as the sides of the rectangular bar press against the dissected insulating lamination. To assure a snug fit between the rotor bars and the slots, the size of any cutting tool mounted along the front edge of the bar desirably should have lateral dimensions smaller than the lateral dimensions of the rotor bars.

What I claim as new and desire to cover by Letters Patent of the United States is:

1. A dynamoelectric machine comprising a first magnetizable member composed of a plurality of juxtaposed sheet metal laminations disposed in axial alignment to form a substantially cylindrical surface, a plurality of axially extending slots circumferentially spaced about said first magnetizable member and opening into said cylindrical surface, conductor bars situated within said axially extended slots of said magnetizable members, laminations of an electrically insulating material juxtaposed with the sheet metal laminations situated at axially opposite ends of said first magnetizable member, said insulating laminations having slit sections registered with the slots of said magnetizable member, said slit sections of said insulating laminations being folded back to overlap at least one edge of the slot in the juxtaposed sheet metal lamination to electrically insulate the conductor bar from the juxtaposed sheet metal laminations, and a second magnetizable member forming a cylindrical surface in a concentric attitude relative to the cylindrical surface of said first magnetizable member, said second magnetizable member being susceptible to rotary motion relative to said first magnetizable member.

2. A dynamoelectric machine according to claim 1 wherein said insulating lamination is characterized by a slit section in axial alignment with each slot in said juxtaposed sheet metal lamination, said insulating lamination having a geometric configuration otherwise identical to the geometrical configuration of said juxtaposed sheet metal laminations.

3. A dynamoelectric machine according to claim 1 wherein a plurality of said insulating laminations are disposed at approximately equally spaced intervals along the axis of said first magnetic member.

4. A dynamoelectric machine according to claim 3 wherein the portions of said slit sections overlapping said juxtaposed sheet metal laminations extend over an axial span approximately equal to the distance between insulating laminations.

5. A dynamoelectric machine comprising:
   I. A rotor characterized by
      a. a plurality of juxtaposed sheet metal laminations disposed in axial alignment along a central shaft to form a substantially cylindrical member, said laminations having punched apertures in registration to form axially extending slots through said cylindrical member,
      b. conductor bars extending through said slots and protruding axially outwardly from at least one end of said cylindrical member, and
      c. conductive means interconnecting the respective ends of said conductor bars;
   II. a stator circumferentially disposed about said sheet metal laminations forming said rotor, and
   III. a support wheel of punched sheet metal laminations substantially identical to the sheet metal laminations forming said rotor axially mounted upon said shaft at a location remote from said rotor laminations, said support wheel being disposed along said shaft at a location such that the protruding ends of said conductor bars extend through the punched apertures of said magnetic laminations forming said support wheel.

6. A dynamoelectric machine according to claim 5 further including insulating laminations disposed adjacent said sheet metal laminations at opposite ends of said rotor, said insulating laminations having pre-slit sections folded back to overlap the edges of the sheet metal laminations juxtaposed therewith to electrically insulate said conductor bars from said sheet metal laminations.

7. A dynamoelectric machine according to claim 6 further including at least one insulating lamination juxtaposed with said sheet metal laminations forming said support wheel and disposed intermediate the sheet metal laminations of said support wheel and said rotor, said insulating lamination having pre-slit sections in registration with the punched apertures of said sheet metal laminations of said support wheel to insulate said conductor bars from said support wheel.

8. A rotor for a dynamoelectric machine comprising a plurality of sheet metal laminations juxtaposed in axial alignment to form a substantially cylindrical surface, said rotor having a plurality of circumferentially disposed slots spaced along the periphery of said member insulating laminations interspersed between said juxtaposed sheet metal laminations to form a plurality of groups of sheet metal laminations separated by at least one insulating lamination, said insulating laminations being slit at locations in registration with the circumferentially disposed slots of said sheet metal laminations to provide leaves within said insulating laminations, said leaves being folded back at a 90° angle relative to the plane of said insulating laminations to overlie the edges of the slot in the adjacent sheet metal laminations, rotor bars extending axially through said slots, said rotor bars contacting said folded back leaves of said insulating laminations and being spaced from said sheet metal laminations by the leaves of said insulating laminations overlying said adjacent slots edges, and means electrically interconnecting the respective ends of said rotor bars.

* * * * *